March 19, 1935. E. SCHEEMACKER 1,994,621
CREAM SEPARATING MILK BOTTLE
Filed Nov. 22, 1933 2 Sheets-Sheet 1
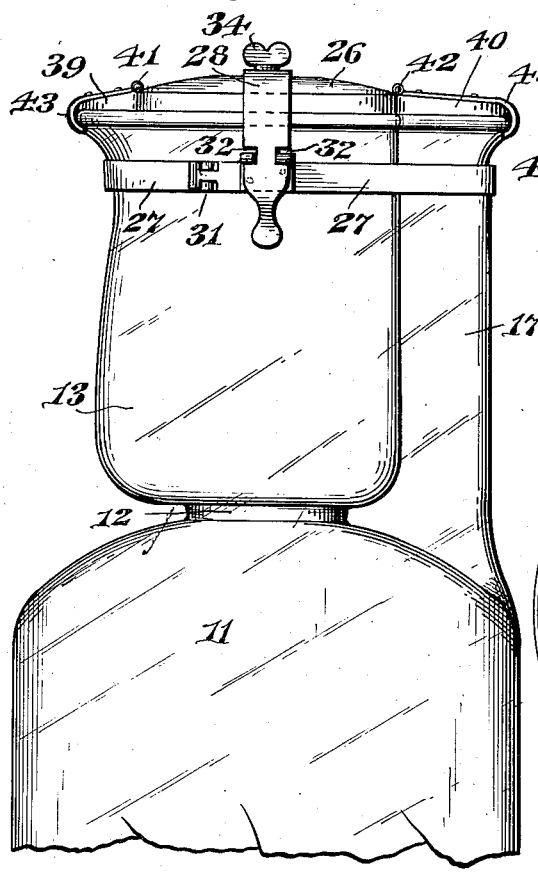
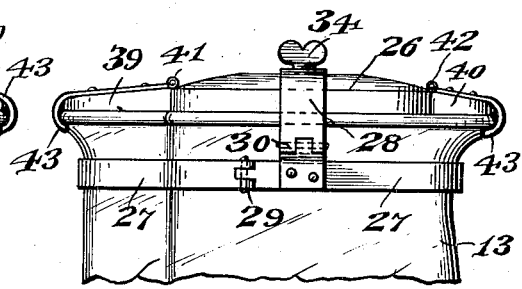
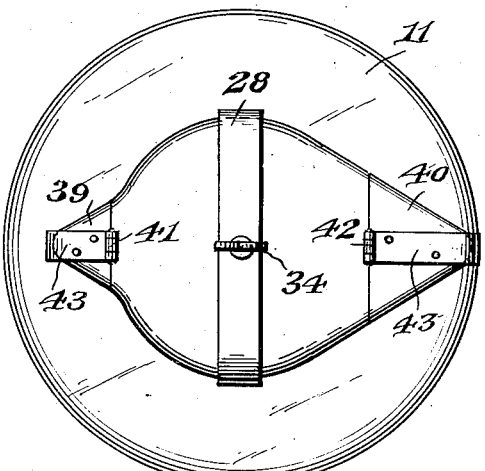
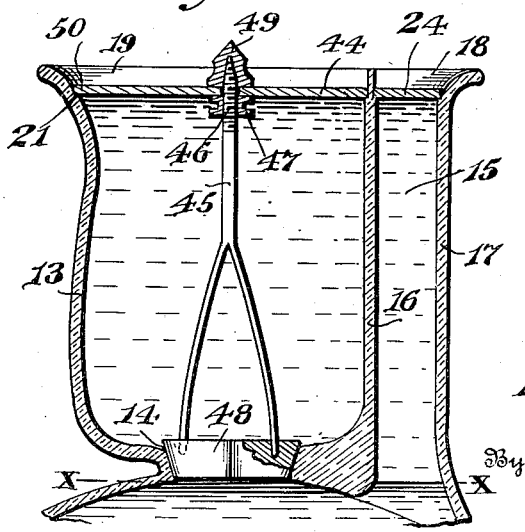
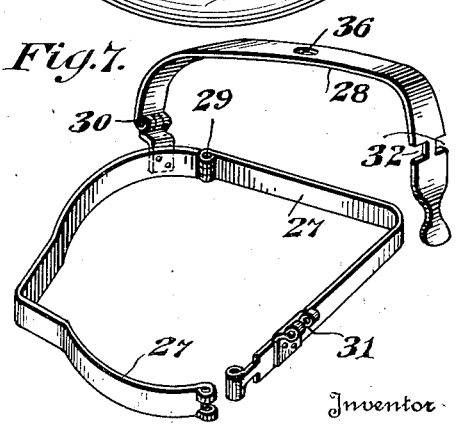
Inventor
Emile Scheemacker,
Attorneys March 19, 1935. E. SCHEEMACKER 1,994,621
CREAM SEPARATING MILK BOTTLE
Filed Nov. 22, 1933 2 Sheets-Sheet 2
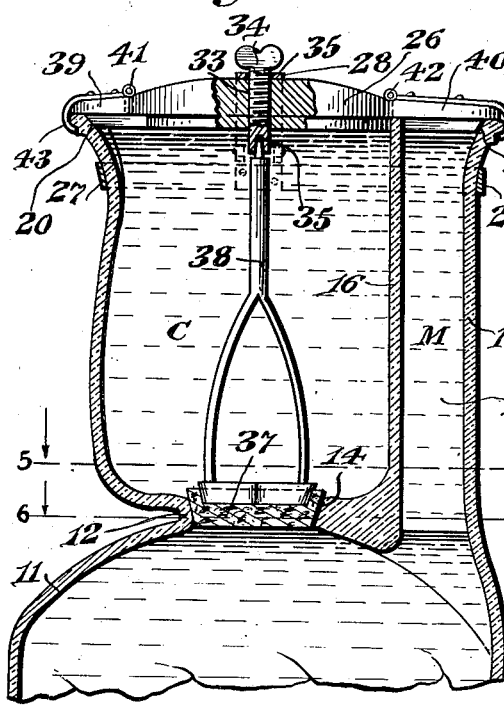
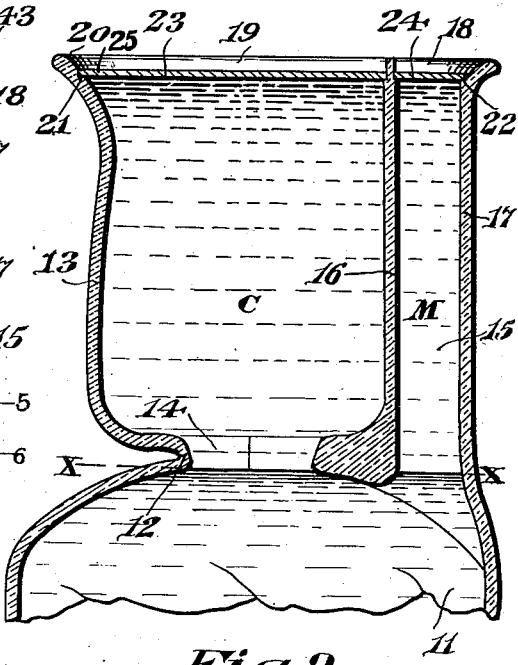
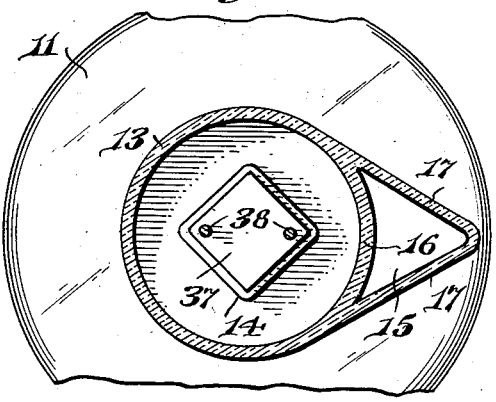
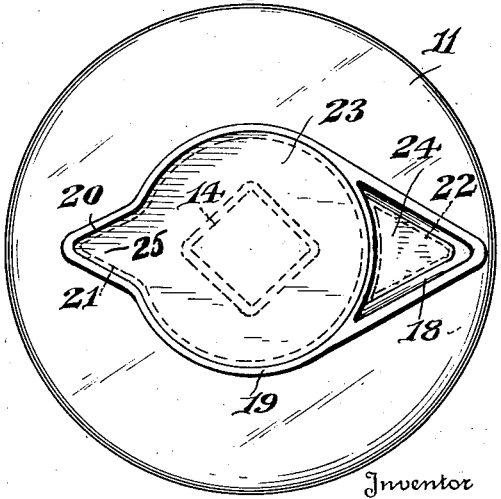
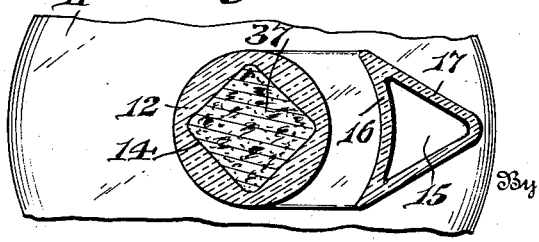
Inventor
Emile Scheemacker,
Attorneys Patented Mar. 19, 1935

1,994,621

UNITED STATES PATENT OFFICE 1,994,621

CREAM SEPARATING MILK BOTTLE

Emile Scheemacker, Blackstone, Mass.

Application November 22, 1933, Serial No. 699,292

5 Claims. (Cl. 215—31)

The present invention relates to containers and more particularly to milk bottles in which milk is delivered to individual consumers and in which the cream rises to the top portion of the bottle.

The object of the invention is to provide a bottle and means cooperating therewith whereby the consumer may pour either milk or cream from the same bottle without the necessity of skimming the cream from the milk.

Another object is to provide means for positively preventing the cream and milk from mixing due to the tilting of the bottle incident to the pouring operation.

In the accompanying drawings:—

Figure 1 is an elevation of a portion of a milk bottle embodying the invention.

Figure 2 is an elevation of a portion of the structure shown in Figure 1 taken from the opposite side.

Figure 3 is a top plan view.

Figure 4 is a sectional view.

Figure 5 is a sectional view taken on the line 5—5 of Figure 4.

Figure 6 is a sectional view taken on the line 6—6 of Figure 4.

Figure 7 is a perspective view of the harness device for fastening the cap to the bottle.

Figure 8 is a sectional view showing a filled and capped bottle as delivered to the consumer.

Figure 9 is a plan view of the filled and capped bottle shown in Figure 8.

Figure 10 is a sectional view showing a modification.

Describing the drawings more particularly, the numeral 11 indicates the body portion of a milk bottle. Above the body portion 11 of the bottle and connected thereto by a necked-in portion 12 is a cream chamber 13 of proper size to contain the cream which rises from the milk in the bottle. The necked-in portion 12 is angular in shape and preferably square as shown in Figures 5 and 9 and a port 14 similar in shape to the exterior form of the necked-in portion connects the cavity of the body portion with that of the cream chamber.

Integrally formed with the bottle and at one side of the cream chamber is a passageway 15 which connects at its lower end with the cavity in the body 11 of the milk bottle. The passageway 15 is separated from the cream chamber 13 by a wall 16 and has outer walls 17 which terminate at the top in a triangular mouth 18 on a plane with the tops of the walls of the cream chamber 13.

At the top of the cream chamber 13 is a mouth designated 19 having at the side thereof opposite to the mouth 18 an outturned lip 20, and around which is an internal seat 21 suitable for the reception of a closure as is common practice with such containers. The walls 16 and 17 of the passage 15 form a seat 22 about the mouth 18 of the passage. The container is adapted to be filled in the ordinary manner and when filled the mouth 19 of the cream chamber and the mouth 18 of the passage 15 are closed by suitably shaped caps 23 and 24 inserted upon the seats 21, 22 respectively. The cap designated 23 has a projection 25 suitable to cover this lip when the bottle is closed.

Describing the means by which the consumer may pour cream or milk from the bottle, 26 designates a cap-like member which is adapted to be positioned upon the top of the bottle over the mouths 19 and 18. To hold the cap 26 in place, a harness member, shown in Figure 7, is strapped around the neck of the bottle below its oppositely flared top. The harness member comprises two suitably shaped strap members 27, which are hinged together at one side and have a latch designated generally 28 at the other. Adjacent the hinge is mounted a cross strap 29 adapted to be swung over the cap member 26 by means of a hinge 30 and to be latched thereon by means of the latching member, designated 31 and notches 32 in the strap member 29.

The cap member 26 has a central bore 33 which is threaded for the reception of a thumb screw 34 which has a socket at the lower end thereof designated 35. The strap member 29 has an aperture 36 therein which, when the device is mounted upon the bottle registers with the bore 33 to permit the passage of the thumb screw 34.

A valve member designated 37 of a suitable size and shape to close the opening 14 in the necked-in portion 12 is intended to be inserted into the cream chamber to cut off communication between the chamber and the body portion 11 of the bottle. This valve portion 37 is mounted upon a bifurcated rod 38 of proper length to extend up through the cream chamber and be engaged by the socket 35 of the thumb screw 34.

When the consumer wishes to mount this device upon the milk bottle, he removes the caps 23 and 24. He then inserts the valve member 37 into the opening between the cream chamber and the body of the bottle by means of the rod 38 and places the cap 26 in position over the top of the bottle. The harness member is placed upon the bottle with the straps 27 encircling the neck thereof, and the strap member 28 swung across the top of the cap 26 and latched down by the latching means 31 and 32. The thumb screw 34 then may be tightened, bearing against the rod 38 and securing the valve member 37 within the opening 14.

The cap member 26 has flap valve members 39 and 40 which close the lip portion 20 of the cream chamber mouth and the mouth 18 of the passage 15 respectively. The valve members 39 and 40 are preferably hinged to the cap 23 as shown at 41 and 42 so as to swing upwardly. The valves bear tongues 43 which extend beyond and are downwardly inwardly bent so as to form clips which engage beneath the outward flare of the bottle top to hold them in closed position.

It is thought that the method of use of the device will be obvious. Assuming that the contents of the bottle is in the condition shown in Figure 8, with the cream C in the cream chamber and the line of separation from the milk M at approximately the line X—X, the consumer removes the paper closures and mounts the cap and valve device as above described. When the consumer has placed the valve in position and attached the cap, he may by tilting the bottle in the proper direction and opening the proper valve, obtain either cream or milk as he desires. The cream cannot mix with the milk due to the tilting of the bottle because of the valve member 37 which separates it.

In Figure 10 is shown a modification in which the use of the cap member 26 is avoided, thus affording a less expensive device.

In the modified form, instead of using the cap 26, the paper cap here designated 44 with which the bottle is originally closed, is used. In this form the bifurcated rod 45 is tapered to a point at its end and threaded as shown at 46. A bearing member 47 is mounted upon the rod, its top surface being on a plane with the surface of the seat 21.

After the consumer has inserted the valve member 48, he presses the cap 44 upon the sharpened end of the rod 45 and forces it down upon the member 48, the sharp end of the rod puncturing the cap. He then may thread the nut 49 upon the end of the rod and tighten it, clamping the rod and cap together. The cap 44 engages the walls of the mouth 19 with sufficient friction to hold the valve member 48 in the opening 14. The lip portion 50 may be bent up to form an operable closure similar to the flap 39 to close the cream chamber when milk is being poured through the passage 15. The cap 26 is used as a closure for the passage 15 when the cream is being poured from the lip 18.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In combination with a container having a body, a superposed cream chamber connected with the body by a necked-in portion and having a mouth at its top and a passage communicating with the body below the necked-in portion and terminating adjacent the mouth of the cream chamber; a valve member adapted to be seated in the necked-in portion to cut off communication between the body of the container and the cream chamber, and means at the top of the chamber for opening the valve.

2. In combination with a container having a body, a superposed cream chamber connected with the body by a necked-in portion and having a mouth at its top and a passage communicating with the body below the necked-in portion and terminating adjacent the mouth of the cream chamber; means for closing the mouth of the cream chamber and the passage, and a valve adapted to be seated in the necked-in portion to close communication between the cream chamber and the body and having means at the top of the chamber for operating it.

3. In combination with a bottle having a body, a superposed cream chamber connected with the body by a necked-in portion and having a mouth at its top and a passage communicating with the body below the necked-in portion and terminating adjacent the mouth of the cream chamber; a closure cap adapted to be secured to the cream chamber and to close the mouth thereof and the passage and having openings communicating with the mouth and passage, respectively, the said openings having separately operable closures and a stopper member secured to and supported by the closure cap and adapted to be seated in the necked-in portion to cut off communication between the body of the container and the cream chamber.

4. In combination with a container having a body and a superposed cream chamber connected with the body and having a mouth at its top, a closure cap adapted to be secured to the cream chamber and to close the mouth thereof, the said cap having a valved pouring opening therein, and a stopper member secured to and supported by the closure cap and adapted to be seated in the necked-in portion to cut off communication between the body of the container and the cream chamber.

5. In combination with a container having a body and a superposed cream chamber having an outwardly flared top and a mouth and connected with the body by a necked-in portion, and a passage communicating with the body at a point below the neck and extending upwardly to a point adjacent the mouth of the cream chamber, a closure comprising a demountable band surrounding the passage and cream chamber below the outwardly flared top of the latter, a yoke hinged to the band on one side and detachably secured thereto on the other side, a cap secured to the yoke and having separately operable hinged flaps acting as closures for the passage and cream chambers respectively, and a stopper member attached to the cap and operating to close off communication between the body of the container and the cream chamber.

EMILE SCHEEMACKER.